Dec. 28, 1965  F. P. SMITH  3,226,130
COASTING VEHICLE STEERED BY TILTABLE RIDER SUPPORTING MEANS
Filed Oct. 31, 1962  2 Sheets-Sheet 1
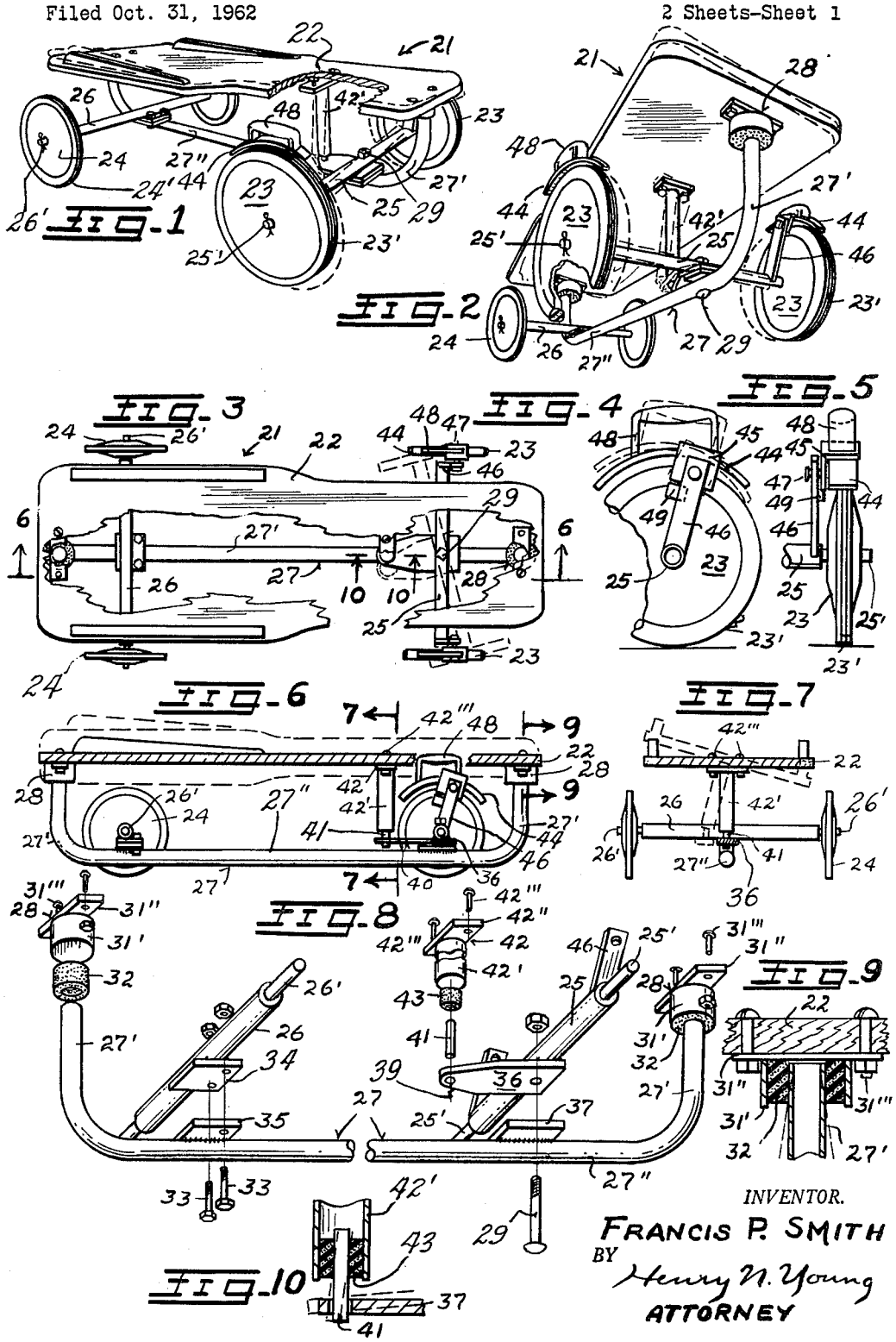
INVENTOR.
FRANCIS P. SMITH
BY
Henry N. Young
ATTORNEY Dec. 28, 1965  F. P. SMITH  3,226,130
COASTING VEHICLE STEERED BY TILTABLE RIDER SUPPORTING MEANS
Filed Oct. 31, 1962  2 Sheets-Sheet 2
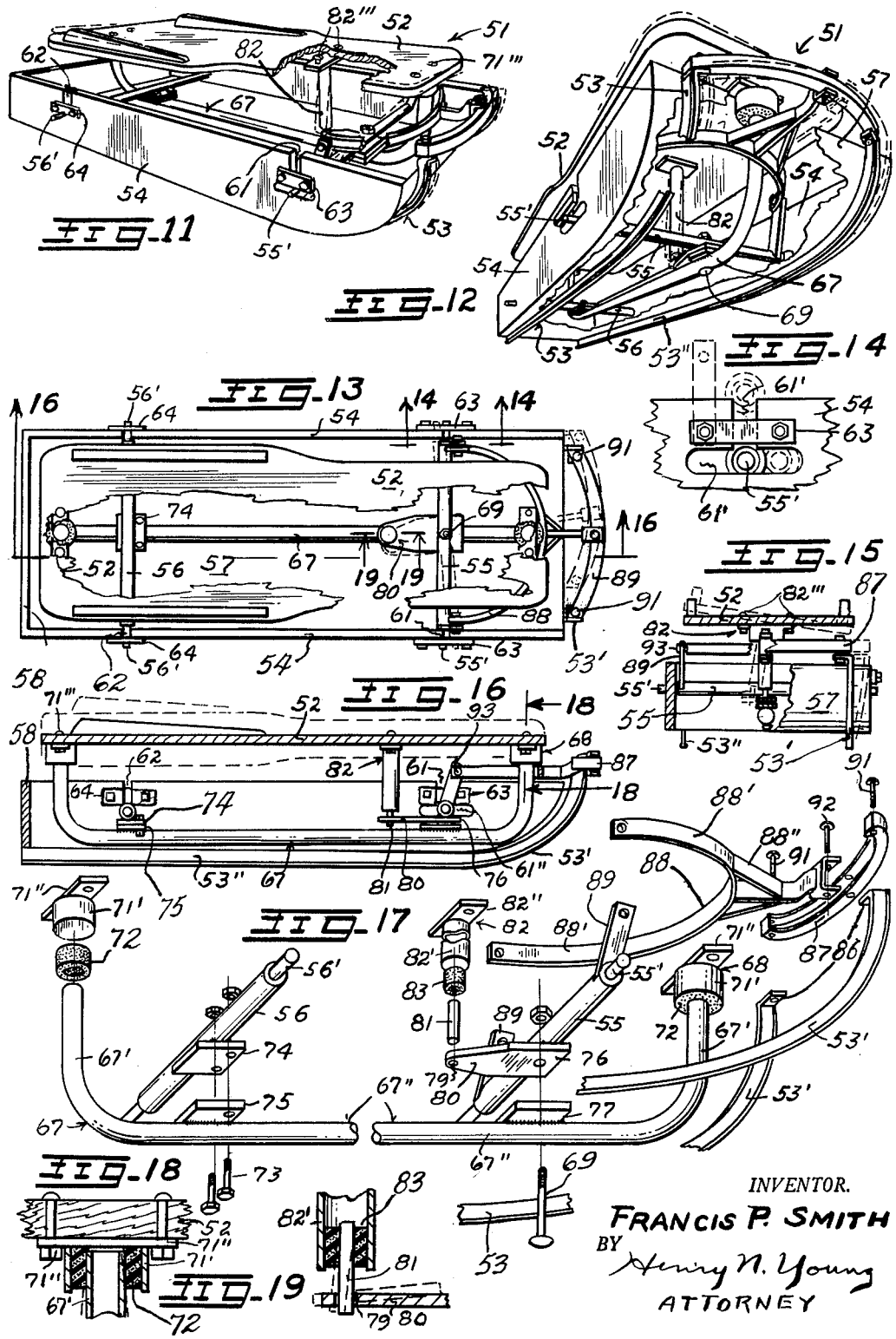
INVENTOR.
FRANCIS P. SMITH
BY Henry N. Young
ATTORNEY United States Patent Office 3,226,130
Patented Dec. 28, 1965

3,226,130
COASTING VEHICLE STEERED BY TILTABLE
RIDER SUPPORTING MEANS
Francis P. Smith, Irvington, Calif.
(2620 Shane Drive, Richmond, Calif.)
Filed Oct. 31, 1962, Ser. No. 234,291
2 Claims. (Cl. 280—22)

The invention relates to a steering control for a dirigible coasting vehicle, which control is independent of any manual steering means.

Understanding that a coaster generally comprises a vehicle which is arranged for its free-running movement by gravity or inertia along a supporting surface, whether on supporting wheels or slide-runners, the present control essentially provides for a lateral tilting of the vehicle bed by a rider for controlledly steering the vehicle during its movements, and it is, accordingly, a general present object to provide a particularly simple and effective coaster-steering control of such a character.

Another object is to provide a steering control for a coaster or the like in which the control is afforded by appropriately lowering the side of the coaster bed nearest the desired direction of turning from a straight-ahead vehicular line of movement.

A further object is to provide the present steering control means in cooperative association with a dirigible running gear carrying the bed-supporting chassis of a rolling or sliding coaster.

A more specific object is to provide a coaster vehicle of the character described having a bed-carrying chassis which is optionally mountable on a running gear providing support wheels or runners for its rolling or sliding movement respectively upon and along dry or icy ground.

An added object is to apply the present steering-control means in a coaster combination which is supported at its different sides on a running gear comprising pairs of wheels which are normally operative in parallel planes and are angularly relatable for vehicle-steering purposes.

Yet another object is to apply the present steering control means in a coaster combination which is supported at its opposite sides on a running gear comprising normally straight and laterally flexible slide runners which are arranged for their lateral flexing for vehicle-steering purposes.

The invention possesses other objects and features of advantage, some of which, with the foregoing, will be set forth or be apparent in the following description of typical embodiments thereof, and in the accompanying drawings, in which, FIGURE 1 is a partly broken-away perspective view of a wheel-supported coaster embodying the present steering control.

FIGURE 2 is an underneath perspective view of the structural combination of FIGURE 1.

FIGURE 3 is a partly broken-away plan view of the wheel-supported coaster showing parts of the supporting chassis.

FIGURE 4 is an enlarged and fragmentary side elevation showing a front chassis-supporting wheel of the coaster and an associated hand brake.

FIGURE 5 is a front elevation of a wheel and brake structure.

FIGURE 6 is a side sectional elevation taken on the line 6—6 in FIGURE 3.

FIGURE 7 is a view taken on the line 7—7 in FIGURE 6.

FIGURE 8 is a partially exploded perspective view of the chassis parts.

FIGURE 9 is an enlarged fragmentary sectional view taken on the line 9—9 in FIGURE 6.

FIGURE 10 is an enlarged fragmentary sectional view taken on the line 10—10 in FIGURE 3.

FIGURE 11 is a partly broken-away perspective view of a runner-supported coaster utilizing the present steering control device, FIGURE 12 is an underneath and broken-away perspective view of the coaster sled of FIGURE 11.

FIGURE 13 is a plan view of the coaster sled with a portion broken away to disclose parts of the supporting chassis.

FIGURE 14 is an enlarged fragmentary view taken on the line 14—14 in FIGURE 13.

FIGURE 15 is a partly sectional front elevation of the coaster sled.

FIGURE 16 is a side sectional elevation taken on the line 16—16 in FIGURE 13.

FIGURE 17 is an exploded perspective view of the coaster sled elements.

FIGURE 18 is an enlarged fragmentary sectional view taken on the line 18—18 in FIGURE 16.

FIGURE 19 is an enlarged fragmentary sectional view taken on the line 19—19 in FIGURE 13.

Coasters embodying my present features of invention are optionally steerable by hand or by foot or by body movements of the rider, have relatively simple structures of attractive appearance, and support a rider at a safe nonturnover level with respect to the supporting surface over which they are moving by gravity or inertia. Also, the body-supporting chassis of a present coaster is interchangeably mountable on rubber-tired metal wheels for engaging the ground or on metal runners for engaging icy or other slide surfaces. The body comprises a more-or-less flat bed which is laterally tiltable on the chassis for a steering of the vehicle by a rider, all in a light-weight structure of adequate strength, such that a practiced rider may steer either present coaster by tilting alone.

The coaster structure 21 of FIGURES 1 to 10 inclusive is of the wheel type, and the assembly thereof comprises an elongated body which essentially comprises a flat planar platform bed 22 which is symmetrical about a longitudinal center line of the body and is wheel-supported at forward and rear points thereof. As shown, pairs of wheels 23 and 24, having suitable rims or tires 23' and 24', respectively engage and carry end portions of forward and rear axle bar members 25 and 26, with the wheel-mounting axle end portions 25' and 26' most simply, but not necessarily, comprising reduced integral trunnion parts of the axle members. The axle bars 25 and 26 intermediately and cooperatively support a rigid U-shaped beam 27, comprising a chassis connection between the wheel-carried axles and the bed 22, and having its sides 27' extending upwardly from the connecting intermediate beam portion 27'' as beam end portions to connections 28 with and beneath the body 22 in a common plane which effectively includes the longitudinal center line of the body. In the present structure, the rear axle 26 is intermediately fixed across the beam portion 27'' in perpendicular relation to the beam plane, and the forward axle 25 carrying the front wheels 23 is intermediately secured to the beam portion 27'' by an upright pivot bolt 29 whereby the coaster may be readily steered out of a straight-ahead movement thereof by turning the axle 25 into an appropriate non-parallel relation to the rear axles 26 by a suitable means which is actuatable by a rider on the coaster.

By particular reference to FIGURES 8 and 9, it will now be noted that the end connections 28 for the beam sides 27' are alike and comprise assemblies of socket members 31' extending integrally from base plate members 31'' by which the members 31' are unitarily attached to and beneath the bed 22, as by clamp bolts 31''' extending through the bed and the base portions 31″. The socket members 31′ complementarily and retainedly (as by their compression therein) mount in the bores thereof tubular elements 32 of resiliently deformable material having uniform bores complementarily and retainedly receiving terminal portions of the beam ends 27′ for completing an attachment of the beam 27 to the bed with the attachment line of the beam disposed beneath and parallel to the longitudinal body line and in the plane of the beam. The material of the resilient elements 32 may be of a rubber or other suitable composition, is preferably homogeneous, and has a coefficient of resiliency such that the beam is normally held with its plane perpendicular to that of the bed plane, yet is yieldingly deflectable out of said plane by and upon a lateral tilting of the bed 22.

It will now be noted that the rearward axle 26 is intermediately and rigidly fixed to and across the intermediate beam portion 27″ in perpendicular relation to the beam plane by means of bolts 33 engaged through and between mutually opposed clamp plates 34 and 35 respectively fixed to the rear axle 26 and the beam portion 27″, as by welding. The pivot bolt 29, by which the front axle 25 is secured to the beam portion 27″, operatively extends through the front axle 25 and the beam and also through mutually opposed bearing plates 36 and 37 which are respectively fixed to the axle 25 and the beam portion 27″, as by welding, in an arrangement which provides for an appropriately limited steering swinging of the axle 25 in a plane which is perpendicular to the plane of the beam. Preferably, and as shown, the plate 36 extends rearwardly beyond the opposed bearing plate 37 for its functioning as a steering arm for the front axle 25, it being understood that the unitary combination of the beam 27, with the plates 35 and 37 on the beam, essentially provides the entire bed-supporting vehicle chassis assembly between the running gear of the wheel-carried axles 25 and 26 and the coaster bed 22.

In the present coaster structure, a hole 39 is provided near the free end of a steering arm 40 extending integrally and rearwardly from the front bearing plate 36 in parallel relation thereto, and rockably and closely receives a steering pin member 41 in depending and effectively rigid relation to the coaster bed 22. The present steering control is essentially such that the permitted lateral tilting of the coaster body 22 on the beam 27 is operative, through the pin 41, to effect a corresponding steering rocking of the wheel-supported axle 25 in accordance with the swaying or rolling of the body of the rider from a normal position on the coaster bed in the desired direction of turning, it being understood that normal dispositions of a rider on the bed of the present coaster body may either by those of sitting upon the bed, or of lying on the bed in a face-down (prone) position. It will be further understood, however, that the present wheeled coaster structure is adaptable for its proportioning and use as a foot-propelled "scooter" on which a rider stands, particularly if its bed mounts an upright balance-aiding and/or steering handle (not shown) while still subject to its steering tilting by an appropriate lateral slanting of the rider's body thereon.

While the steering pin 41 might depend rigidly from the bed 22 for its engagement in the hole 39 of the arm 40 of the bearing plate 36, the pin 41 is preferably arranged for its limited deflection from its normal perpendicular relation to the bed 22 against resilient resistance, whereby its action may be desirably cushioned with respect to the steeringly controlled front-wheel assembly. Accordingly, and as brought out in FIGURES 6 to 8 inclusive, the pin 41 is carried by and from an assembly 42 which provides a socket portion 42′ depending integrally from a base plate 42″ by which the members 42 are unitarily attached to and beneath the bed 22, as by clamp bolts 42‴ operatively engaged through the bed 22 and the base portion 42″. The socket portion 42′ of the member 42 complementarily and retainedly receives therein a tubular element 43 of resiliently deformable material having an axial bore which complementarily and retainedly receives the upper end of the steering pin 41 for completing a constant supported attachment of the pin 41 to the bed 22. The material of the resilient element 43 is of a suitable composition for its use and could be of the nature of that used for the elements 32 of the beam-attaching assemblies 28.

Wheel brakes are provided in association with the front wheels 23 of the present wheel-carried coaster 21, and essentially comprise independently actuatable brake shoes 44 carried by members 45 which are rockably mounted at the ends of arms 46 extending fixedly and obliquely upwardly and forwardly from the axle bar 25 adjacent the shoulders provided at the inner ends of the terminal stub shafts 25′ thereof. As particularly shown in FIGURES 3 to 5, each arm 46 is generally flat, while the member 45 is of angle section and carries the brake shoe 44 on the inner side of one flange thereof and has its other flange hingedly attached to the outer ends of the arms 46 by a pivot pin 47 for a brake-engaging rocking of the member about an axis parallel to that of the axle bar 25.

For facilitating a working application of a brake shoe 44, a D-handle member 48 is fixed to and along the outer side of the shoe 44 and has its rearward and forward ends respectively fixed to relatively spaced points of the shoe and the shoe-carrying flange of the member 45, as by welding, the arrangement being essentially such that a rider sitting or lying prone upon the coaster bed 22 may manually grasp one or both handle members 48 for operatively rocking the advance end portion of the shoe 44 against the rim or tire 23′ of the opposed ground-engaging wheel 23. As indicated in FIGURES 4 and 5, stop extensions 49 extend fixedly and rearwardly from the rearward edges of the arms 46 for their normal engagement by a biasing means, such as the action of gravity, with the lower edges of the pivoted flanges of the member 45 normally engaging the stops 49 to prevent possible destructive engagements of the rear shoe end portions with the wheel rim or tire during a forward rolling of the wheel.

The coaster-sled structure 51 of FIGURES 11 to 19 inclusive comprises an elongated body which provides a flat bed 52 corresponding to the bed 22 of the first embodiment and supported by a connecting chassis from ground-engaging support runners 53 which are mounted beneath and carry mutually parallel and fixedly spaced upright and complementary side plate members 54 disposed below the bed 52 at opposite sides of the coaster. As shown, the members 54 engage and carry forward and rear chassis-supporting bars 55 and 56 corresponding to the axle bars 25 and 26 of the described wheeled embodiment, with said support bars having reduced terminal portions 55′ and 56′ extending from shoulders provided by the bars thereat.

Preferably, and as shown, terminal forward portions 53′ of the runners 53 and the forward edge portions of the corresponding forward end portions of the side plates 54 are smoothly curved upwardly and forwardly from generally corresponding intermediate runner and plate points. A suitably stiff and imperforate plate member 57 fixedly connects and spaces the bottom edges of the side plates 54 and has the rearward runner portions 53″ suitably fixed to and beneath it in parallel lines spaced slightly upwardly and equally from the outer faces of the sides 54, whereby said forward runner and side plate portions are cooperative as a "prow" for the support base provided behind them by the runners and plate. The plate 57 also functions as a guard against a picked-up entry and retention in the space above the plate 57 and between the sides 54 of material from a surface supporting the traveling coaster. As shown, the upright rear ends of the side plates 54 are connected by an upright cross-plate 58 for laterally stiffening thereat the primary support assembly essentially comprising the unitarily associated runners 53 and side plates 54 and the guard plate 57, and the space thus defined between the side plates 54 and above the guard plate 57 is arranged to protectively contain a major portion of the chassis assembly which mounts the bed on the bars 55 and 56.

In the present coaster sled structure, the ends 55' of the forward support bar 55 are slidably engageable in the bottoms of mutually aligned T slots 61 having their stem portions 61' depending from points of the top edges of the plates adjacent and rearwardly of the rearward ends of the curved forward runner portions 53' to elongated cross portions 61" extending in a common plane above and parallel to the common plane of the straight ground-engaging edge portions 53" of the runners 53. Toward the rear ends thereof, the side plates 54 are provided with aligned slots 62 extending from the top edges of the plates 54 for complementarily receiving and supporting the opposite end portions 56' of the bar 56 at the slot bottoms. A suitable means is preferably provided for releasably retaning the ends 55' and 56' of the bar members 55 and 56 respectively at the bottoms of the slots 61 and 62, and said means is shown as comprising stop members 63 and 64 removably mounted on the plates 54 above the inserted bar ends 55' and 56' and across the slots 61 and 62 respectively at the outer plate faces.

It will now be noted that the bars 55 and 56 intermediately and cooperatively support a rigid planar U-shaped seat-supporting beam 67 having the extremities of its sides 67' extending upwardly from the connecting intermediate beam portion 67" to connections 68 with and beneath the bed 52, with the beam plane effectively including said longitudinal center line of the body. In the present structure, the rear support bar 56 is intermediately fixed across the beam portion 67" in perpendicular relation to the beam plane, and the forward support bar 55 is intermediately secured to said beam portion by an upright pivot bolt 69 whereby the bar 55 may be rocked in a plane perpendicular to the beam plane and out of its normal perpendicular relation to the said beam plane by a suitable means which is actuatable upon the runners 53 as a sled-steering means by and upon a tilting of the coaster bed 52 as taught for the control of the front axle bar 25 of the assembly of the embodiment of FIGURES 1 to 10 inclusive.

By particular reference to FIGURES 17 and 18, it will now be noted that the end connections 68 of the beam sides 67' are alike and comprise members having socket portions 71' extending integrally from base plate portions 71" by which the members are unitarily attached to and beneath the body 52, as by clamp bolts 71"' extending through the body bed 52 and the base portions 71". The socket portions 71' complementarily and retainedly (as by their compression therein) contain tubular elements 72 of resiliently deformable material having uniform bores complementarily and retainedly receiving terminal portions of the beam sides 67' for completing an attachment of the beam 67 to the bed with the attachment line of the beam disposed beneath and parallel to the longitudinal body line and in the plane of the beam. The material of the resilient elements 72 may be of a rubber or other suitable composition, is preferably homogeneous, and has a risiliency coefficient such that the beam is normally held by the elements 72 with its plane perpendicular to that of the bed plane, yet is yieldingly deflectable out of said plane by and upon a lateral tilting of the bed 52 by the action of a rider supported thereon.

It will now be noted that the bar member 56 is intermediately and rigidly fixed to and across the intermediate beam portion 67" in perpendicular relation to the beam plane by means of bolts 73 engaged through and between mutually opposed and engaged plates 74 and 75 respectively fixed to the bar 56 and the beam portion 67", as by welding. The pivot bolt 69, by which the front bar 55 is secured to the beam portion 67"', operatively extends through said bar and the beam and also through mutually opposed bearing plates 76 and 77 which are respectively fixed to the bar 55 and the beam 67, as by welding, in an arrangement which provides for an appropriate swinging of the bar 55 in a plane which is perpendicular to the plane of the beam. Preferably, and as shown, the plate 76 extends rearwardly beyond the opposed bearing plate 77 for its functioning as a rocking tongue for the front bar 55, and it will be noted that the unitary combination of the beam 67 and the bearing plates 75 and 77 thereon are arranged to cooperatively function, in effect, as the vehicle chassis assembly between the wheel-carried axles 25 and 26 and the bed 22 of the wheeled coaster 21, with the axle bar 55 utilized as a steering means for the present coaster.

In the present coaster structure, a hole 79 is provided near the free end of a steering arm 80 extending integrally and rearwardly from the front bearing plate 76 in parallel relation thereto, and rockably and closely receives a steering pin member 81 in depending and effectively rigid relation to the coaster bed 52. The present steering control is essentially such that a lateral tilting of the coaster body 52 on the beam 67 is operative, through the pin 81, to effect a corresponding rocking of the pivoted bar 66 in accordance with the swaying or rolling of the body of the rider from a normal position on the coaster bed in the desired direction of turning, it being understood that normal dispositions of a rider on the bed of the present coaster body may either be those of sitting upon the bed, or of lying on the bed in a face-down prone position. In view of the fact that a sled rider, and particularly a rider of a smaller sled, may use a foot-mounted shoe as a brake by frictionally engaging the shoe with the ground laterally adjacent the moving sled, no brake device has been shown in connection with the present coaster sled structure, but it will, however, be understood that a suitable handle-operated ground-engaging brake shoe of a usual type for larger coaster sleds might be mounted on the bed 52 for effecting a hand or foot application of the brake shoe by a rider.

While the tongue-positioning, or steering, pin 81 might depend rigidly from the bed 52 for its engagement in the hole 79 of the tongue 80, the pin 81 is preferably arranged for its slight deflection from its normal perpendicular relation to the bed 52 against resilient resistance, whereby its action may be desirably cushioned with respect to the runner assembly which is steeringly controlled by the positioning control of the steering tongue 77 by the pin. Accordingly, the pin 81 is carried by an assembly 82 which provides a socket portion 82' depending integrally from a base plate portion 82" by which the members 82 are unitarily attached to and beneath the body 52, as by clamp bolts 82"' operatively extending through the bed and the base portion 82". The socket portion 82' of the member 82 complementarily and retainedly receives therein a tubular element 83 of resiliently deformable material having an axial bore which complementarily and retainedly receives the upper end of the steering pin 81 for completing a constant supported and operative attachment of the pin 81 to the coaster bed 52. The material of the resilient element 83 is of a suitable composition for its use and could be of the nature of that used for the element 32 by which the bed 22 of the previously described wheel-supported coaster is attached to the beam 27.

It will now be noted that the present runners 53 are resiliently flexible laterally thereof, are of T section and have the web portions of their straight parts 53" suitably fixed, as by welding or bolting them, to and along the guard plate 57 solely rearwardly of corresponding runner points which are slightly rearward of the curved runner parts 53' and below the plate 57, whereby the runner portions ahead of the fixed runner portions are free for their lateral flexing opposite the upturned forward part of the plate 57 and under control of the steering pin 81 through a suitable connection of the forward runner ends with the rockable bar member 55, it being understood that the under faces of the flange portions of the runners 53 provide the support surfaces for the present runner-supported coaster assembly.

As particularly shown, the forward ends of the runner portions 53" are provided with mutually inturned ears 86 which are linked by a spreader bar 87 of relatively rigid structure for maintaining the mutual spacing of the runners thereat, while said bar is intermediately and pivotally attached to a symmetrical connection comprising a yoke member 88 having the ends of its sides 88', which extend from a yoke stem portion 88" hinged about a common axis to arms 89 extending fixedly and radially upwardly in a common plane from the ends of the intermediate portion of the bar member 55, it being noted that the arms 89 correspond to, and may comprise, the arms 46 which carry the brake shoes 44 in the previously described wheeled coaster structure. Preferably, and as shown, upright pivot bolts 91 hingedly connect the ears 86 to the ends of the spreader bar 87, and an upright pivot bolt 92 connects the stem portion 88" of the yoke 88 with the spreader bar 87 centrally thereof. Coaxial bolts 93 terminally connect the yoke sides 88' to the arms 89 whereby a tilt-produced turning of the steering bar 55 by the described coaction of the pin 81 with the steering tongue 77 in accordance with the degree of tilting of the tiltable bed 52 from its normal position, is arranged to provide an appropriate lateral steering deflection of the forward runner portions 53'.

In view of the foregoing disclosures respecting the described wheel-mounted and runner-mounted coasters, it will be understood that the steering controls provided for the present wheel-supported and runner-supported coasters are effectively identical and are equally adapted for their operative applicaton to both types of supports for coasters. While I have shown and described arrangements which I now consider to comprise preferred embodiments of my invention, I desire to have it understood that the showings are primarily illustrative, and that such changes and developments may be made, when desired, as fall within the scope of the following claims:

I claim:

1. In a coaster vehicle adapted for its free coasting movement upon and along a supporting surface and providing a bed for directly supporting a rider, a planar and rigid chassis member depending from and rockably supporting said vehicle bed for a lateral tilting of the body on the chassis member with respect to an axis longitudinal of the bed, means yieldingly biasing said chassis member toward a normal perpendicular relation of its plane to said bed, a running gear providing laterally spaced cross-bars upon which the chassis member is supported, at least one of said cross-bars being pivotally related to the chassis member for movement in a plane parallel to said longitudinal axis, means cooperative between the bed and the pivoted said cross-bar whereby a turning movement of the pivoted said cross-bar with relation to the longitudinal axis of the vehicle will result when a tilting movement of the bed about said axis is imparted to the bed by the rider, and laterally spaced runners carried by and beneath a unitary base structure which directly supports the cross-bars for a steering turning of the pivoted cross-bar, corresponding straight rearward portions of said runners being fixedly related to said runner base structures in mutually parallel relation while the forward end portions of said runners are flexibly free and are laterally deflectable with respect to the fixed portions thereof and are terminally connected with the opposite ends of said pivoted cross-bar whereby a steering rocking of the pivoted cross-bar is operative to laterally and correspondingly deflect the runner portions connected to the latter cross-bar.

2. In a coaster vehicle adapted for its free coasting movement upon and along a supporting surface, an elongated bed for directly and fully supporting a rider, a rigid U-shaped and planar chassis member having its sides directly and terminally hinged to and depending from and supporting said vehicle bed at forward and rearward points thereof for a lateral tilting of the body on the member and about an axis longitudinal of the bed, means yieldingly biasing said chassis member toward a fixed perpendicular relation of its plane to said bed, a running gear providing laterally spaced cross-bars supportingly engaging the side-connecting part of the chassis member at intermediate points of the cross-bars and in perpendicular relation to the plane of the chassis member, the forward one of said cross-bars being intermediately pivoted to said chassis member for movement in a plane parallel to said longitudinal axis, ground-engaging members cooperatively supporting the corresponding ends of said cross-bars, and means whereby a turning movement of the pivoted cross-bar with relation to the longitudinal axis of the vehicle will be effected against the resistance of said biasing means for the chassis when a tilting movement is imparted to the bed by the rider, said last means comprising laterally spaced runners having rearward portions thereof fixedly related to the rear of said cross-bar while forward end portions of said runners are laterally deflectable with respect to the fixed portions thereof and are connected with the ends of the pivoted cross-bar whereby a steering rocking of the pivoted cross-bar is operative to laterally and correspondingly deflect the forward runner portions.

References Cited by the Examiner

UNITED STATES PATENTS

| 1,548,073 | 8/1925 | Beeler | 280—87.01 |
| 2,027,128 | 1/1936 | Tessmer | 280—22 |
| 2,103,998 | 12/1937 | Birkhead | 280—87.01 X |
| 2,187,437 | 1/1940 | Wanat | 280—18 |
| 2,292,130 | 8/1942 | Krauss | 280—22 |
| 2,330,147 | 9/1943 | Rodriguez | 280—11.28 |
| 3,023,022 | 2/1962 | Boyden | 280—87.04 |

FOREIGN PATENTS

| 3,400 | 1876 | Great Britain. |

BENJAMIN HERSH, *Primary Examiner.*

A. HARRY LEVY, PHILIP ARNOLD, *Examiners.*